US009075651B2

(12) United States Patent
Pechanek et al.

(10) Patent No.: US 9,075,651 B2
(45) Date of Patent: Jul. 7, 2015

(54) METHODS AND APPARATUS FOR EFFICIENT COMPLEX LONG MULTIPLICATION AND COVARIANCE MATRIX IMPLEMENTATION

(75) Inventors: Gerald George Pechanek, Cary, NC (US); Ricardo Rodriguez, Raleigh, NC (US); Matthew Plonski, Morrisville, NC (US); David Strube, Raleigh, NC (US); Kevin Coopman, Redwood City, CA (US)

(73) Assignee: Altera Corporation, San Jose, CA (US)

( * ) Notice: Subject to any disclaimer, the term of this patent is extended or adjusted under 35 U.S.C. 154(b) by 475 days.

(21) Appl. No.: 13/613,769

(22) Filed: Sep. 13, 2012

(65) Prior Publication Data

US 2013/0007421 A1    Jan. 3, 2013

Related U.S. Application Data

(60) Division of application No. 12/689,307, filed on Jan. 19, 2010, now Pat. No. 8,335,812, which is a continuation of application No. 11/438,418, filed on May 22, 2006, now Pat. No. 7,680,873, which is a continuation of application No. 10/004,010, filed on Nov. 1, 2001, now Pat. No. 7,072,929.

(60) Provisional application No. 60/244,861, filed on Nov. 1, 2000.

(51) Int. Cl.
| | |
|---|---|
| *G06F 17/15* | (2006.01) |
| *G06F 17/16* | (2006.01) |
| *G06F 9/30* | (2006.01) |
| *G06F 7/48* | (2006.01) |
| *G06F 9/32* | (2006.01) |
| *G06F 9/38* | (2006.01) |

(52) U.S. Cl.
CPC .............. *G06F 7/4812* (2013.01); *G06F 17/16* (2013.01); *G06F 9/325* (2013.01); *G06F 9/3885* (2013.01); *G06F 17/15* (2013.01); *G06F 2207/3896* (2013.01); *G06F 9/30014* (2013.01)

(58) Field of Classification Search
CPC ........ G06F 7/4812; G06F 17/15; G06F 17/16
See application file for complete search history.

(56) References Cited

U.S. PATENT DOCUMENTS

| | | | | |
|---|---|---|---|---|
| 5,990,834 A | * | 11/1999 | Barrick et al. | 342/418 |
| 6,144,711 A | * | 11/2000 | Raleigh et al. | 375/347 |
| 6,675,187 B1 | * | 1/2004 | Greenberger | 708/622 |

* cited by examiner

*Primary Examiner* — Chuong D Ngo
(74) *Attorney, Agent, or Firm* — Law Offices of Peter H. Priest, PLLC

(57) ABSTRACT

Efficient computation of complex long multiplication results and an efficient calculation of a covariance matrix are described. A parallel array VLIW digital signal processor is employed along with specialized complex long multiplication instructions and communication operations between the processing elements which are overlapped with computation to provide very high performance operation. Successive iterations of a loop of tightly packed VLIWs may be used allowing the complex multiplication pipeline hardware to be efficiently used.

20 Claims, 21 Drawing Sheets

ENCODING

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| GROUP | | S/P | UNIT | | | MAUopcode | | | | | | Rte | | | | 0 | Rx | | | | | Ry | | | | | | CE3 | | ME | |

SYNTAX/OPERATION

| INSTRUCTION | OPERANDS | OPERATION | ACF |
|---|---|---|---|
| | | | DUAL HALFWORDS |
| MPYCXL.[SP]M.2SH | Rte, Rx, Ry | DO OPERATION BELOW BUT DO NOT AFFECT ACFs | NONE |
| MPYCXL.[NVZ].[SP]M.2SH | Rte, Rx, Ry | Rto ← (Rx.H1*Ry.H1-Rx.H0*Ry.H0)<br>Rte ← (Rx.H1*Ry.H0+Rx.H0*Ry.H1) | F1<br>F0 |
| [TF].MPYCXL.[SP]M.2SH | Rte, Rx, Ry | DO OPERATION ONLY IF T/F CONDITION IS SATISFIED IN ACFs | NONE |

ARITHMETIC SCALAR FLAGS AFFECTED (ON THE LEAST SIGNIFICANT OPERAND (Rte))
C = NO EFFECT
N = MSB OF RESULT
V = 1 IF AN INTEGER OVERFLOW OCCURS ON EITHER RESULT, 0 OTHERWISE
Z = 1 IF A ZERO RESULT IS GENERATED, 0 OTHERWISE
CYCLES: 2

ENCODING

| 31 30 | 29 28 27 | 26 25 24 23 22 21 | 20 19 18 17 | 16 | 15 14 13 12 11 | 10 9 8 7 6 | 5 4 3 2 | 1 0 |
|---|---|---|---|---|---|---|---|---|
| GROUP | S/P UNIT | MAUopcode | Rte | 0 | Rx | Ry | CE3 | ME |

SYNTAX/OPERATION

| INSTRUCTION | OPERANDS | OPERATION | ACF |
|---|---|---|---|
| | | | DUAL HALFWORDS |
| MPYCXJL.[SP]M.2SH | Rte, Rx, Ry | DO OPERATION BELOW BUT DO NOT AFFECT ACFs | NONE |
| MPYCXJL.[NVZ].[SP]M.2SH | Rte, Rx, Ry | Rto ← (Rx.H1*Ry.H1+Rx.H0*Ry.H0)<br>Rte ← (Rx.H0*Ry.H1-Rx.H1*Ry.H0) | F1<br>F0 |
| [TF].MPYCXJL.[SP]M.2SH | Rte, Rx, Ry | DO OPERATION ONLY IF T/F CONDITION IS SATISFIED IN ACFs | NONE |

ARITHMETIC SCALAR FLAGS AFFECTED (ON THE LEAST SIGNIFICANT OPERAND (Rte) OR AS SPECIFIED)
C = NOT AFFECTED
N = MSB OF RESULT
V = 1 IF AN INTEGER OVERFLOW OCCURS ON EITHER RESULT, 0 OTHERWISE
Z = 1 IF A ZERO RESULT IS GENERATED, 0 OTHERWISE
CYCLES: 2

ENCODING

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| GROUP | | S/P | UNIT | | | MAUopcode | | | | | | Rte | | | | 0 | | | Rx | | | | | Ry | | | | CE3 | | ME | |

SYNTAX/OPERATION

| INSTRUCTION | OPERANDS | OPERATION | ACF |
|---|---|---|---|
| | | | DUAL HALFWORDS |
| MPYCXLA.[SP]M.2SH | Rte, Rx, Ry | DO OPERATION BELOW BUT DO NOT AFFECT ACFs | NONE |
| MPYCXLA.[NVZ].[SP]M.2SH | Rte, Rx, Ry | Rto←Rto+(Rx.H1*Ry.H1-Rx.H0*Ry.H0)<br>Rte←Rte+(Rx.H1*Ry.H0+Rx.H0*Ry.H1) | F1<br>F0 |
| [TF].MPYCXLA.[SP]M.2SH | Rte, Rx, Ry | DO OPERATION ONLY IF T/F CONDITION IS SATISFIED IN ACFs | NONE |

ARITHMETIC SCALAR FLAGS AFFECTED (ON THE LEAST SIGNIFICANT OPERAND (Rte))
C = NOT AFFECTED
N = MSB OF RESULT
V = 1 IF AN INTEGER OVERFLOW OCCURS ON EITHER RESULT, 0 OTHERWISE
Z = 1 IF A ZERO RESULT IS GENERATED, 0 OTHERWISE
CYCLES: 2

FIG. 5A

ENCODING

500

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| GROUP | | S/P | | UNIT | | MAUopcode | | | | | Rte | | | | | 0 | | | | | Rx | | | | | Ry | | | CE3 | | ME |

FIG. 5B

SYNTAX/OPERATION

510

| INSTRUCTION | OPERANDS | OPERATION | ACF |
|---|---|---|---|
| | | | DUAL HALFWORDS |
| MPYCXJLA.[SP]M.2SH | Rte, Rx, Ry | DO OPERATION BELOW BUT DO NOT AFFECT ACFs | NONE |
| MPYCXJLA.[NVZ].[SP]M.2SH | Rte, Rx, Ry | Rto←Rto+(Rx.H1*Ry.H1+Rx.H0*Ry.H0)<br>Rte←Rte+(Rx.H0*Ry.H1-Rx.H1*Ry.H0) | F1<br>F0 |
| [TF].MPYCXJLA.[SP]M.2SH | Rte, Rx, Ry | DO OPERATION ONLY IF T/F CONDITION IS SATISFIED IN ACFs | NONE |

ARITHMETIC SCALAR FLAGS AFFECTED (ON THE LEAST SIGNIFICANT OPERAND (Rte))
C = NOT AFFECTED
N = MSB OF RESULT
V = 1 IF AN INTEGER OVERFLOW OCCURS ON EITHER RESULT, 0 OTHERWISE
Z = 1 IF A ZERO RESULT IS GENERATED, 0 OTHERWISE
CYCLES: 2

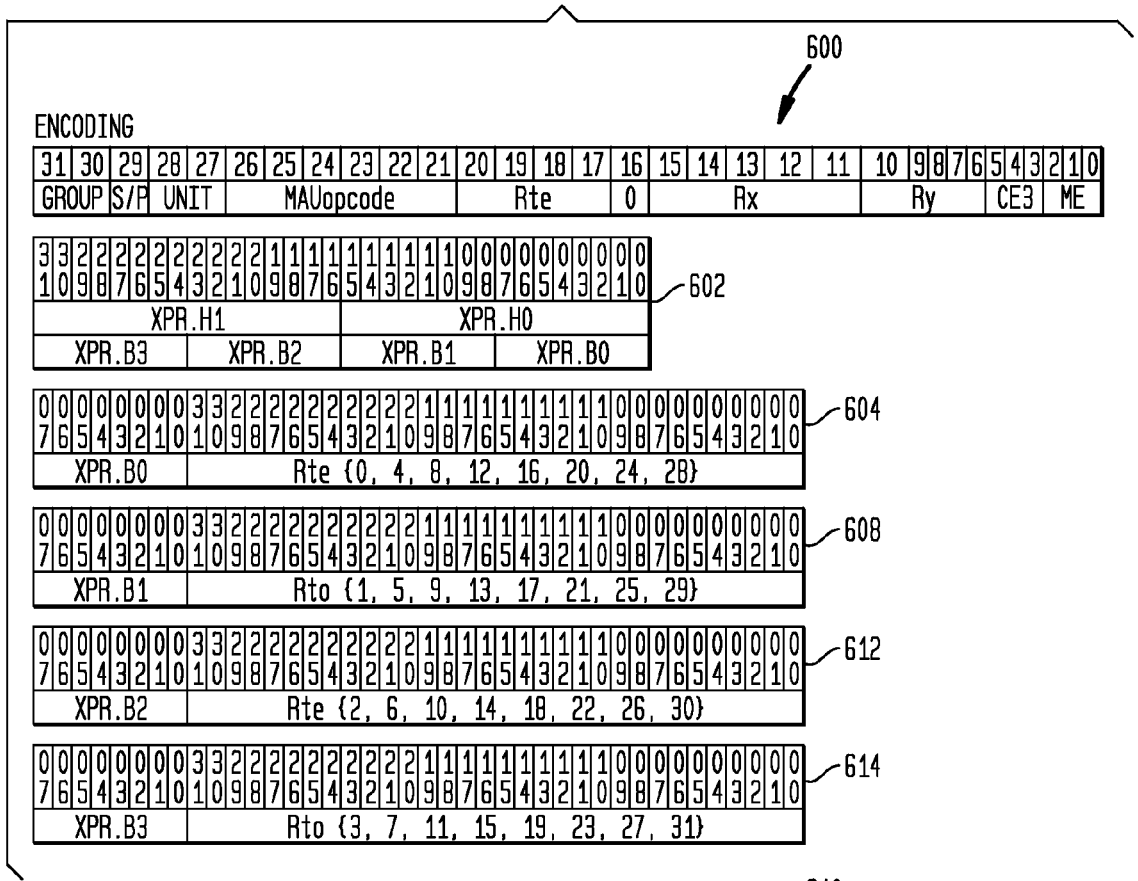

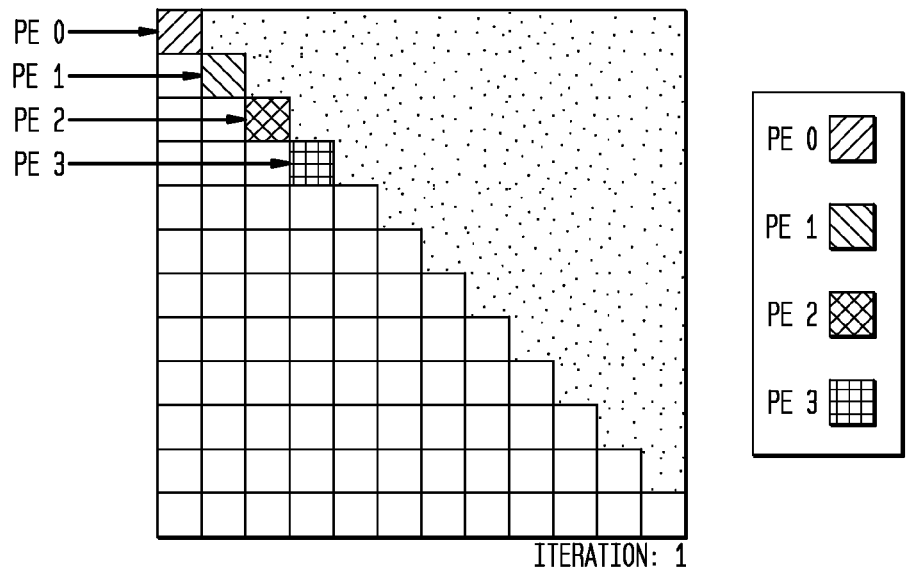
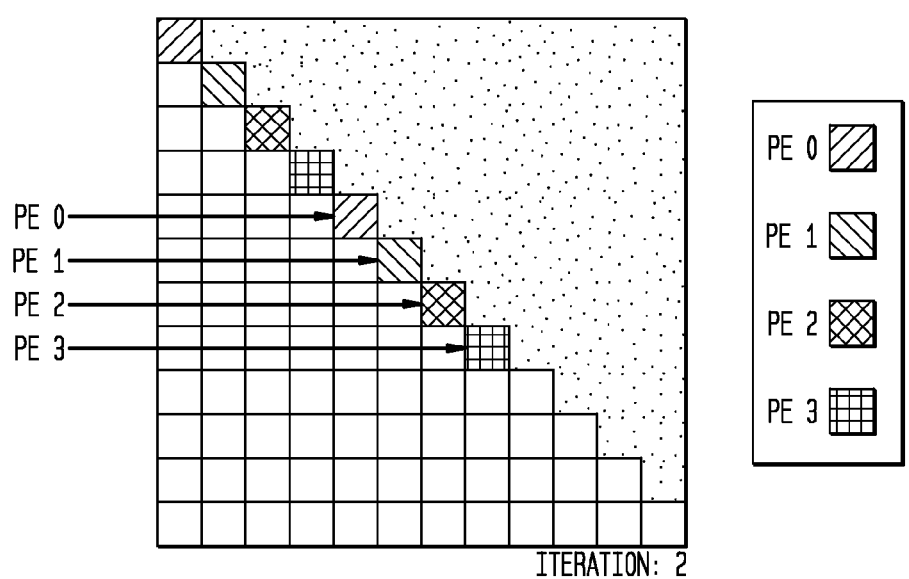

METHODS AND APPARATUS FOR EFFICIENT COMPLEX LONG MULTIPLICATION AND COVARIANCE MATRIX IMPLEMENTATION

RELATED APPLICATIONS

The present application is a divisional of U.S. Ser. No. 12/689,307 filed Jan. 19, 2012 which is a continuation of U.S. Ser. No. 11/438,418 filed May 22, 2006 issued as U.S. Pat. No. 7,680,873 which is a continuation of U.S. Ser. No. 10/004,010 filed Nov. 1, 2001 issued as U.S. Pat. No. 7,072,929 and claims the benefit of U.S. Provisional Application Ser. No. 60/244,861 filed Nov. 1, 2000, which are incorporated by reference herein in their entirety.

FIELD OF THE INVENTION

The present invention relates generally to improvements to parallel processing, and more particularly to methods and apparatus for efficiently calculating the result of a long complex multiplication. Additionally, the present invention relates to the advantageous use of this approach for the calculation of a covariance matrix.

BACKGROUND OF THE INVENTION

The product of two complex numbers x and y is defined to be $z=x_R y_R - x_I y_I + i(x_R y_I + x_I y_R)$, where $x=x_R+ix_I$, $y=y_R+iy_I$ and i is an imaginary number, or the square root of negative one, with $i^2=-1$. This complex multiplication of x and y is calculated in a variety of contexts, and it has been recognized that it will be highly advantageous to perform this calculation faster and more efficiently.

SUMMARY OF THE INVENTION

The present invention defines hardware instructions to calculate the product of two complex numbers encoded as a pair of two fixed-point numbers of 16 bits each. The product may be calculated in two cycles with single cycle pipeline throughput efficiency, or in a single cycle. The product is encoded as a 32 bit real component and a 32 bit imaginary component. The present invention also defines a series of multiply complex instructions with an accumulate operation. Additionally, the present invention also defines a series of multiply complex instructions with an extended precision accumulate operation. The complex long instructions and methods of the present invention may be advantageously used in a variety of contexts, including calculation of a fast Fourier transform as addressed in U.S. patent application Ser. No. 09/337,839 filed Jun. 22, 1999 entitled "Efficient Complex Multiplication and Fast Fourier Transform (FFT) Implementation on the ManArray Architecture" which is incorporated by reference herein in its entirety. The multiply complex instructions of the present invention may be advantageously used in the computation of a covariance matrix, as described below.

A more complete understanding of the present invention, as well as other features and advantages of the invention will be apparent from the following Detailed Description and the accompanying drawings.

BRIEF DESCRIPTION OF THE DRAWINGS

FIG. 2A illustrates a multiply complex long (MPYCXL) instruction in accordance with the present invention;

FIGS. 2B and 2C illustrate the syntax and operation of the MPYCXL instruction of FIG. 2A;

FIG. 3A illustrates a multiply complex conjugate long (MPYCXJL) instruction in accordance with the present invention;

FIGS. 3B and 3C illustrate the syntax and operation of the MPYCXJL instruction of FIG. 3A;

FIG. 4A illustrates a multiply complex long accumulate (MPYCXLA) instruction in accordance with the present invention;

FIGS. 4B and 4C illustrate the syntax and operation of the MPYCXLA instruction of FIG. 4A;

FIG. 5A illustrates a multiply complex conjugate long accumulate (MPYCXJLA) instruction in accordance with the present invention;

FIGS. 5B and 5C illustrate the syntax and operation of the MPYCXJLA instruction of FIG. 5A;

FIG. 6A illustrates a multiply complex long extended precision accumulate (MPYCXLXA) instruction in accordance with the present invention;

FIGS. 6B and 6C illustrate the syntax and operation of the MPYCXLXA instruction of FIG. 6A;

FIGS. 11A-11I illustrate the calculation of a covariance matrix on a 2×2 processing array in accordance with the present invention.

DETAILED DESCRIPTION

Figure 1:
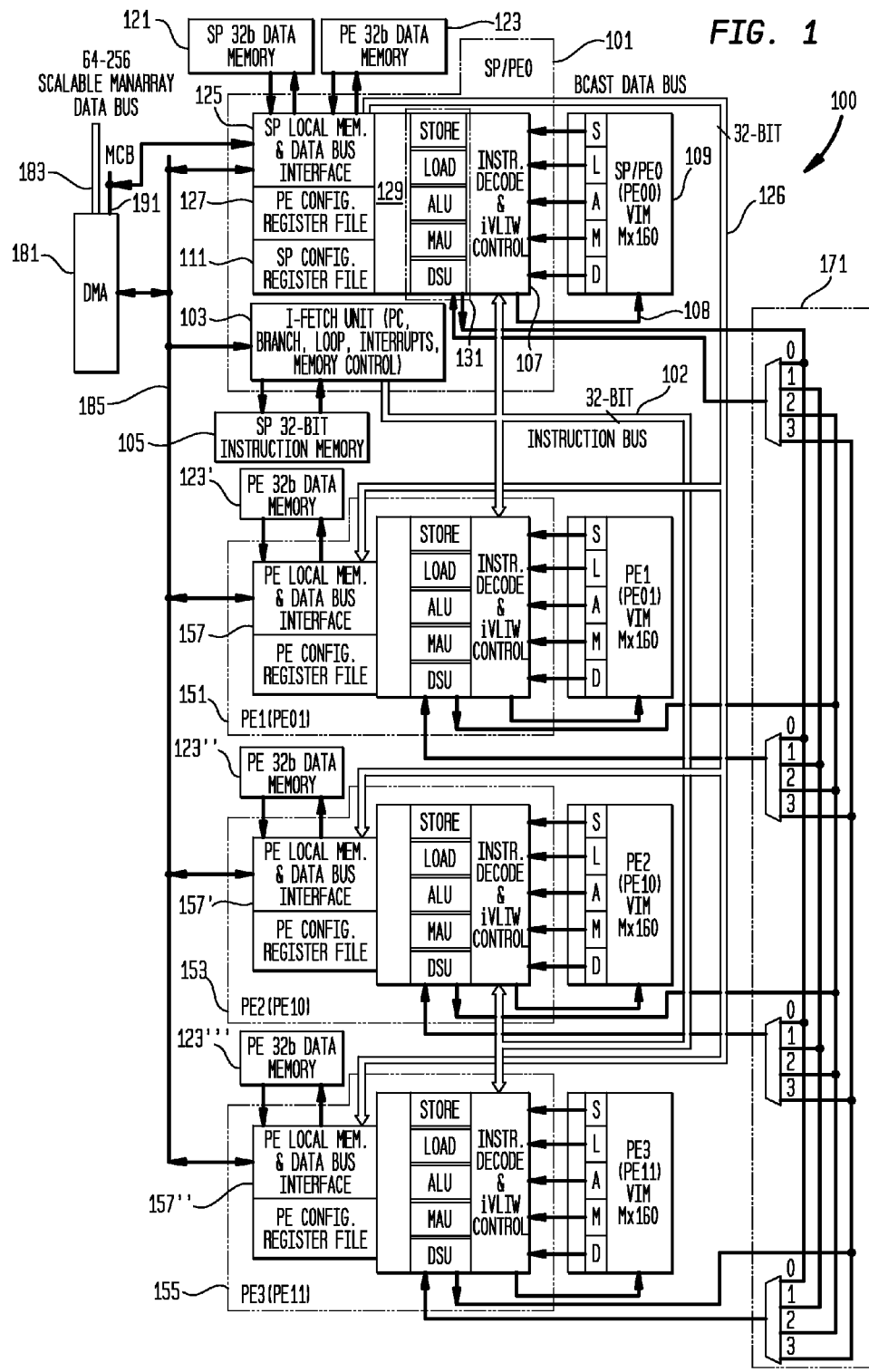
FIG. 1 illustrates an exemplary 2×2 ManArray iVLIW processor.

Further details of a presently preferred ManArray core, architecture, and instructions for use in conjunction with the present invention are found in: U.S. patent application Ser. No. 08/885,310 filed Jun. 30, 1997, now U.S. Pat. No. 6,023,753, U.S. patent application Ser. No. 08/949,122 filed Oct. 10, 1997, now U.S. Pat. No. 6,167,502, U.S. patent application Ser. No. 09/169,256 filed Oct. 9, 1998, now U.S. Pat. No. 6,167,501, U.S. patent application Ser. No. 09/169,072 filed Oct. 9, 1998, now U.S. Pat. No. 6,219,776, U.S. patent application Ser. No. 09/187,539 filed Nov. 6, 1998, now U.S. Pat. No. 6,151,668, U.S. patent application Ser. No. 09/205,558 filed Dec. 4, 1998, now U.S. Pat. No. 6,173,389, U.S. patent application Ser. No. 09/215,081 filed Dec. 18, 1998, now U.S. Pat. No. 6,101,592, U.S. patent application Ser. No. 09/228,374 filed Jan. 12, 1999, now U.S. Pat. No. 6,216,223, U.S. patent application Ser. No. 09/471,217 filed Dec. 23, 1999, now U.S. Pat. No. 6,260,082, U.S. patent application Ser. No. 09/472,372 filed Dec. 23, 1999, now U.S. Pat. No. 6,256,683, U.S. patent application Ser. No. 09/238,446 filed Jan. 28, 1999, U.S. patent application Ser. No. 09/267,570 filed Mar.

12, 1999, U.S. patent application Ser. No. 09/337,839 filed Jun. 22, 1999, U.S. patent application Ser. No. 09/350,191 filed Jul. 9, 1999, U.S. patent application Ser. No. 09/422,015 filed Oct. 21, 1999, U.S. patent application Ser. No. 09/432,705 filed Nov. 2, 1999, U.S. patent application Ser. No. 09/596,103 filed Jun. 16, 2000, U.S. patent application Ser. No. 09/598,567 filed Jun. 21, 2000, U.S. patent application Ser. No. 09/598,564 filed Jun. 21, 2000, U.S. patent application Ser. No. 09/598,566 filed Jun. 21, 2000, U.S. patent application Ser. No. 09/598,558 filed Jun. 21, 2000, U.S. patent application Ser. No. 09/598,084 filed Jun. 21, 2000, U.S. patent application Ser. No. 09/599,980 filed Jun. 22, 2000, U.S. patent application Ser. No. 09/711,218 filed Nov. 9, 2000, U.S. patent application Ser. No. 09/747,056 filed Dec. 12, 2000, U.S. patent application Ser. No. 09/853,989 filed May 11, 2001, U.S. patent application Ser. No. 09/886,855 filed Jun. 21, 2001, U.S. patent application Ser. No. 09/791,940 filed Feb. 23, 2001, U.S. patent application Ser. No. 09/792,819 filed Feb. 23, 2001, U.S. patent application Ser. No. 09/791,256 filed Feb. 23, 2001, U.S. patent application Ser. No. 10/013,908 entitled "Methods and Apparatus for Efficient Vocoder Implementations" filed Oct. 19, 2001, Provisional Application Ser. No. 60/251,072 filed Dec. 4, 2000, Provisional Application Ser. No. 60/281,523 filed Apr. 4, 2001, Provisional Application Ser. No. 60/283,582 filed Apr. 13, 2001, Provisional Application Ser. No. 60/287,270 filed Apr. 27, 2001, Provisional Application Ser. No. 60/288,965 filed May 4, 2001, Provisional Application Ser. No. 60/298,624 filed Jun. 15, 2001, Provisional Application Ser. No. 60/298,695 filed Jun. 15, 2001, Provisional Application Ser. No. 60/298,696 filed Jun. 15, 2001, Provisional Application Ser. No. 60/318,745 filed Sep. 11, 2001, Provisional Application Ser. No. 60/340,620 entitled "Methods and Apparatus for Video Coding" filed Oct. 30, 2001, Provisional. Application Ser. No. 60/335,159 entitled "Methods and Apparatus for a Bit Rate Instruction" filed Nov. 1, 2001, all of which are assigned to the assignee of the present invention and incorporated by reference herein in their entirety.

In a presently preferred embodiment of the present invention, a ManArray 2×2 iVLIW single instruction multiple data stream (SIMD) processor 100 shown in FIG. 1 contains a controller sequence processor (SP) combined with processing element-0 (PE0) SP/PE0 101, as described in further detail in U.S. application Ser. No. 09/169,072 entitled "Methods and Apparatus for Dynamically Merging an Array Controller with an Array Processing Element". Three additional PEs 151, 153, and 155 are also utilized. It is noted that the PEs can be also labeled with their matrix positions as shown in parentheses for PE0 (PE00) 101, PE1 (PE01) 151, PE2 (PE10) 153, and PE3 (PE11) 155.

The SP/PE0 101 contains a fetch controller 103 to allow the fetching of short instruction words (SIWs) from a 32-bit instruction memory 105. The fetch controller 103 provides the typical functions needed in a programmable processor such as a program counter (PC), branch capability, digital signal processing, EP loop operations, support for interrupts, and also provides the instruction memory management control which could include an instruction cache if needed by an application. In addition, the SIW I-Fetch controller 103 dispatches 32-bit SIWs to the other PEs in the system by means of a 32-bit instruction bus 102.

In this exemplary system, common elements are used throughout to simplify the explanation, though actual implementations are not so limited. For example, the execution units 131 in the combined SP/PE0 101 can be separated into a set of execution units optimized for the control function, e.g. fixed point execution units, and the PE0 as well as the other PEs 151, 153 and 155 can be optimized for a floating point application. For the purposes of this description, it is assumed that the execution units 131 are all of the same type in the SP/PE0 and the other PEs. In a similar manner, SP/PE0 and the other PEs use a five instruction slot iVLIW architecture which contains a very long instruction word memory (VIM) memory 109 and an instruction decode and VIM controller function unit 107 which receives instructions as dispatched from the SP/PE0's I-Fetch unit 103 and generates the VIM addresses-and-control signals 108 required to access the iVLIWs stored in the VIM. These iVLIWs are identified by the letters SLAMD in VIM 109. The loading of the iVLIWs is described in further detail in U.S. patent application Ser. No. 09/187,539 entitled "Methods and Apparatus for Efficient Synchronous MIMD Operations with iVLIW PE-to-PE Communication". Also contained in the SP/PE0 and the other PEs is a common PE configurable register file 127 which is described in further detail in U.S. patent application Ser. No. 09/169,255 entitled "Methods and Apparatus for Dynamic Instruction Controlled Reconfiguration Register File with Extended Precision".

Due to the combined nature of the SP/PE0, the data memory interface controller 125 must handle the data processing needs of both the SP controller, with SP data in memory 121, and PE0, with PE0 data in memory 123. The SP/PE0 controller 125 also is the source of the data that is sent over the 32-bit broadcast data bus 126. The other PEs 151, 153, and 155 contain common physical data memory units 123', 123", and 123''' though the data stored in them is generally different as required by the local processing done on each PE. The interface to these PE data memories is also a common design in PEs 1, 2, and 3 and indicated by PE local memory and data bus interface logic 157, 157' and 157". Interconnecting the PEs for data transfer communications is the cluster switch 171 more completely described in U.S. patent application Ser. No. 08/885,310 entitled "Manifold Array Processor", U.S. application Ser. No. 09/949,122 entitled "Methods and Apparatus for Manifold Array Processing", and U.S. application Ser. No. 09/169,256 entitled "Methods and Apparatus for ManArray PE-to-PE Switch Control". The interface to a host processor, other peripheral devices, and/or external memory can be done in many ways. The primary mechanism shown for completeness is contained in a direct memory access (DMA) control unit 181 that provides a scalable ManArray data bus 183 that connects to devices and interface units external to the ManArray core. The DMA control unit 181 provides the data flow and bus arbitration mechanisms needed for these external devices to interface to the ManArray core memories via the multiplexed bus interface represented by line 185. A high level view of a ManArray Control Bus (MCB) 191 is also shown.

All of the above noted patents are assigned to the assignee of the present invention and incorporated herein by reference in their entirety.

Turning now to specific details of the ManArray processor as adapted by the present invention, the present invention defines the following special hardware instructions that execute in each multiply accumulate unit (MAU), one of the execution units 131 of FIG. 1 and in each PE, to handle the multiplication of complex numbers.

Figure 2C:
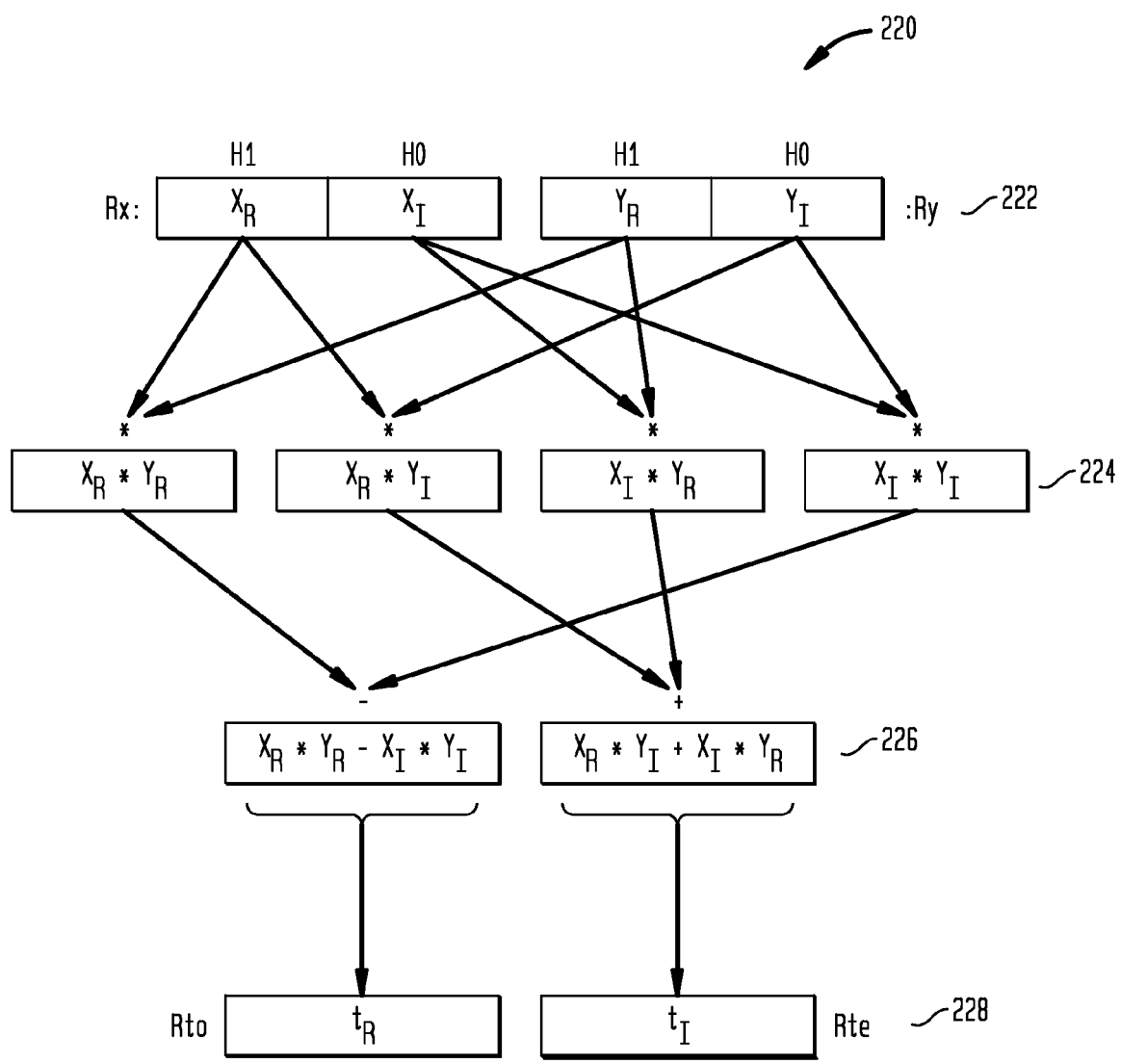

FIG. 2A shows a multiply complex long (MPYCXL) instruction 200 for the multiplication of two complex numbers in accordance with the present invention. The syntax and operation description 210 of the MPYCXL instruction 200 are shown in FIGS. 2B and 2C. As seen in diagram 220 of FIG. 2C, the MPYCXL instruction 200 provides for the multiplication of two complex numbers stored in source register Rx and source register Ry. In step 222, the complex numbers to be multiplied are organized in the source registers such that H1 contains the real component of the complex numbers and H0 contains the imaginary component of the complex numbers. In step 224, the complex numbers are multiplied to produce the products Xr*Yr, Xr*Yi, Xi*Yr and Xi*Yi. Next, in step 226, the products are subtracted and added in the form of (Xr*Yr)−(Xi*Yi) and (Xr*Yi)+(Xi*Yr). In step 228, the final result is written back to the target registers at the end of an operation cycle of the MPYCXL instruction 200 with a 32-bit real component and a 32-bit imaginary component placed in the target registers such that Rto contains the 32-bit real component and Rte contains the 32-bit imaginary component.

Figure 3C:
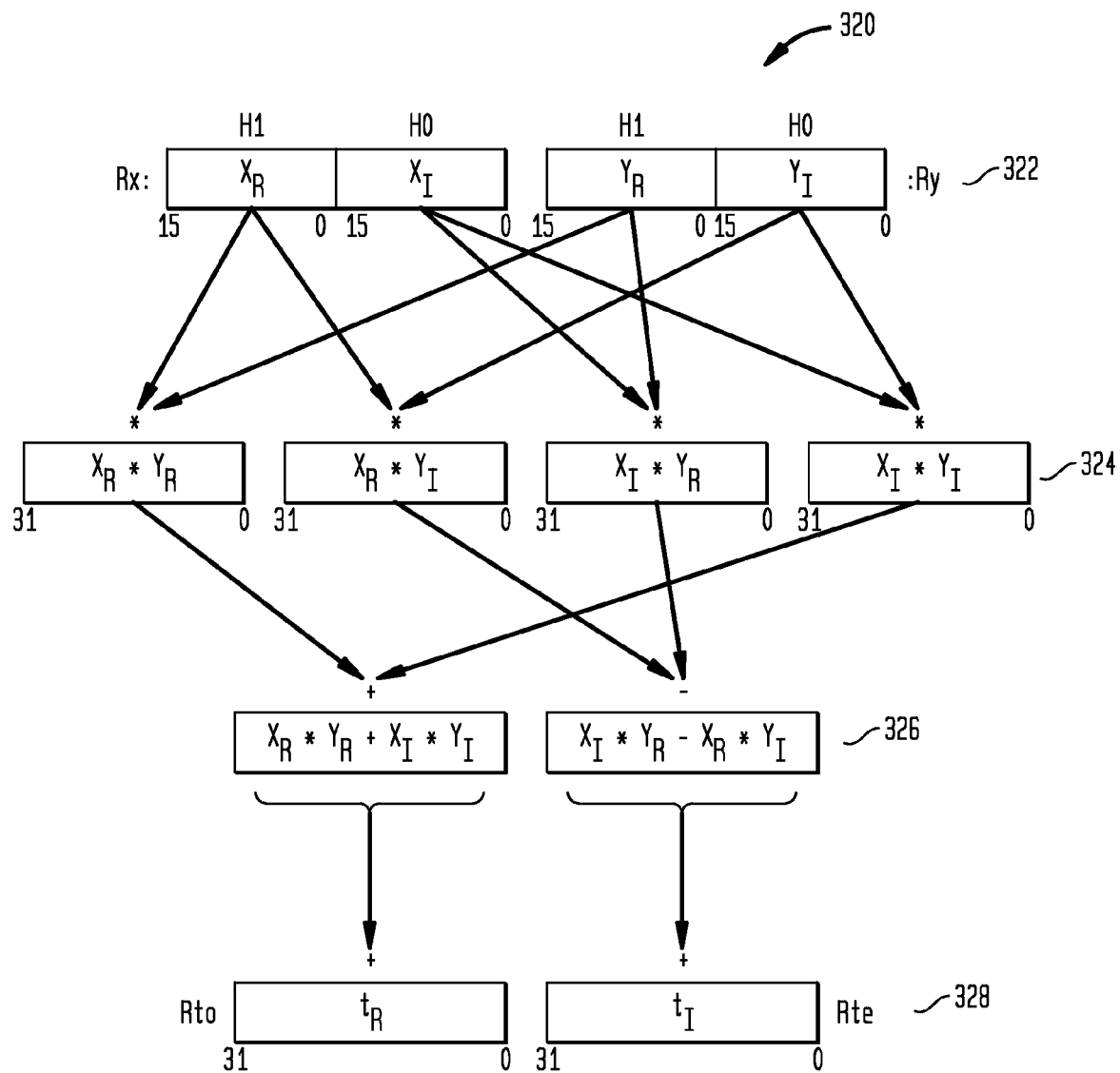

FIG. 3A shows a multiply complex conjugate long (MPYCXJL) instruction 300 for the multiplication of a first complex number and the conjugate of a second complex number in accordance with the present invention. The syntax and operation description 310 of the MPYCXJL instruction 300 are shown in FIGS. 3B and 3C. As seen in diagram 320 of FIG. 3C, the MPYCXJL instruction 300 provides for the multiplication of two complex numbers stored in source register Rx and source register Ry. In step 322, the complex numbers to be multiplied are organized in the source registers such that H1 contains the real component of the complex numbers and H0 contains the imaginary component of the complex numbers. In step 324, the complex numbers are multiplied to produce the products Xr*Yr, Xr*Yi, Xi*Yr and Xi*Yi. Next, in step 326, the products are subtracted and added in the form of (Xr*Yr)+(Xi*Yi) and (Xi*Yr)−(Xr*Yi). In step 328, the final result is written back to the target registers at the end of an operation cycle of the MPYCXJL instruction 300 with a 32-bit real component and a 32-bit imaginary component placed in the target registers such that Rto contains the 32-bit real component and Rte contains the 32-bit imaginary component.

Figure 4C:
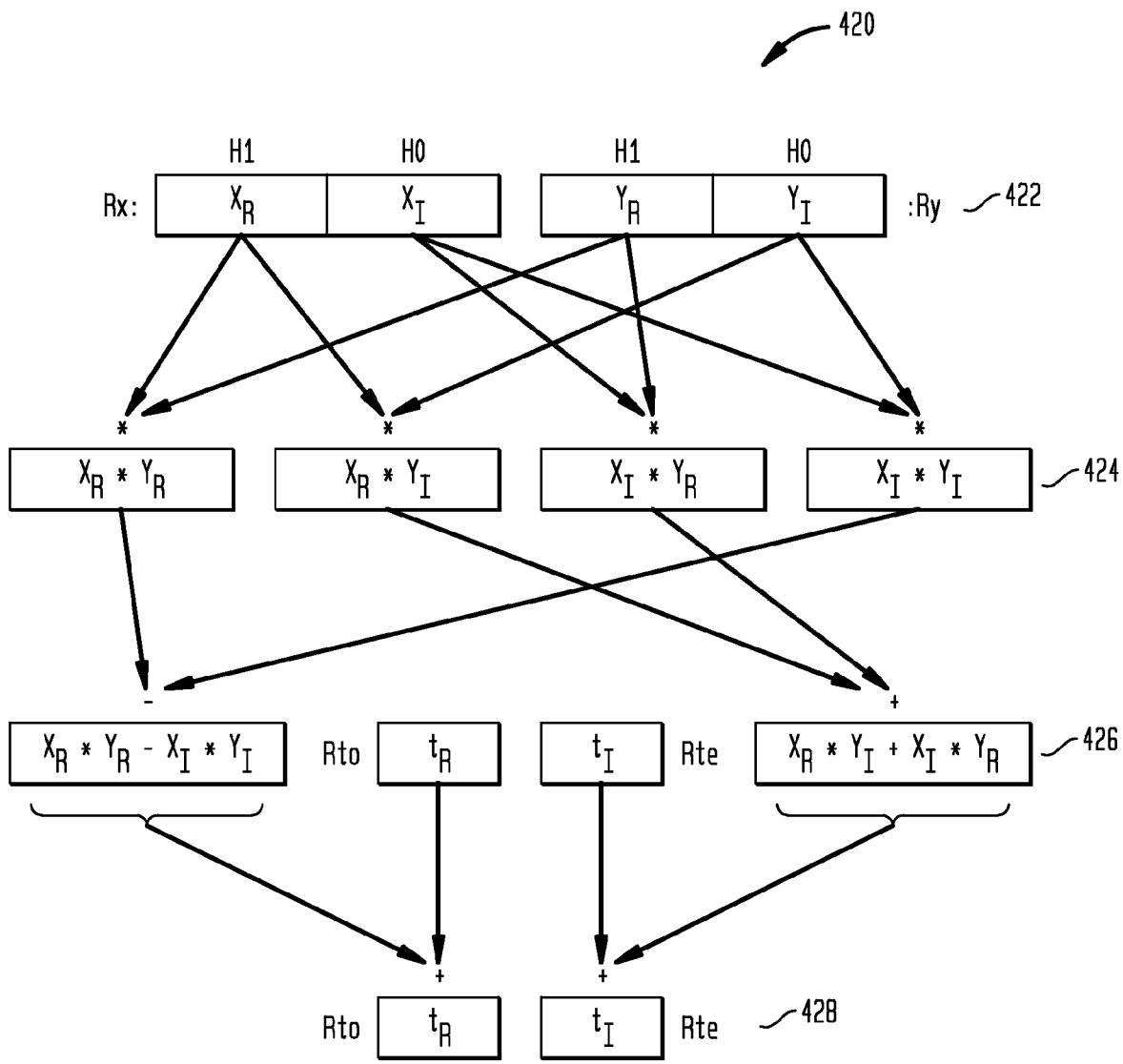

FIG. 4A shows a multiply complex long accumulate (MPYCXLA) instruction 400 for the multiplication of two complex numbers to form a product which is accumulated with the contents of target registers in accordance with the present invention. The syntax and operation description 410 of the MPYCXLA instruction 400 are shown in FIGS. 4B and 4C. As seen in diagram 420 of FIG. 4C, the MPYCXLA instruction 400 provides for the multiplication of two complex numbers stored in source register Rx and source register Ry. In step 422, the complex numbers to be multiplied are organized in the source registers such that H1 contains the real component of the complex numbers and H0 contains the imaginary component of the complex numbers. In step 424, the complex numbers are multiplied to produce the products Xr*Yr, Xr*Yi, Xi*Yr and Xi*Yi. Next, in step 426, the products are subtracted and added in the form of (Xr*Yr)−(Xi*Yi) and (Xr*Yi)+(Xi*Yr). In step 428, (Xr*Yr)−(Xi*Yi) is added to the contents of target register Rto and (Xr*Yi)+(Xi*Yr) is added, or accumulated, to the contents of target register Rte. The final result is written back to the target registers at the end of an operation cycle of the MPYCXLA instruction 400 with a 32-bit real component and a 32-bit imaginary component placed in the target registers such that Rto contains the 32-bit real component and Rte contains the 32-bit imaginary component. For a two cycle embodiment, the target registers are fetched on a second cycle of execution to allow repetitive pipelining to a single accumulation register even-odd pair.

Figure 5C:
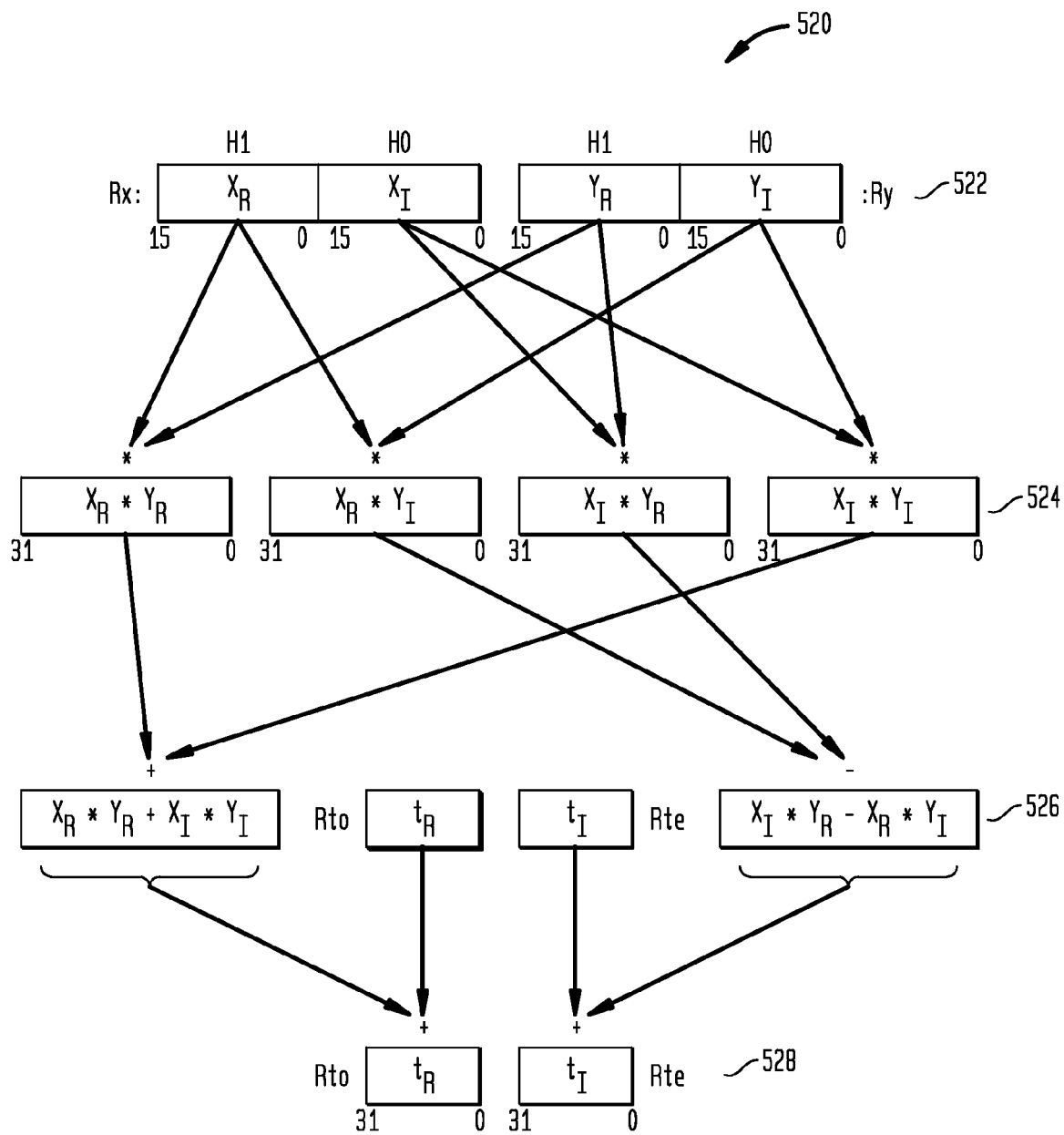

FIG. 5A shows a multiply complex conjugate long accumulate (MPYCXJLA) instruction 500 for the multiplication of a first complex number and the conjugate of a second complex number to form a product which is accumulated with the contents of target registers in accordance with the present invention. The syntax and operation description 510 of the MPYCXJLA instruction 500 are shown in FIGS. 5B and 5C. As seen in diagram 520 of FIG. 5C, the MPYCXJLA instruction 500 provides for the multiplication of two complex numbers stored in source register Rx and source register Ry. In step 522, the complex numbers to be multiplied are organized in the source registers such that H1 contains the real component of the complex numbers and H0 contains the imaginary component of the complex numbers. In step 524, the complex numbers are multiplied to produce the products Xr*Yr, Xr*Yi, Xi*Yr and Xi*Yi. Next, in step 526, the products are added and subtracted in the form of (Xr*Yr)+(Xi*Yi) and (Xi*Yr)−(Xr*Yi). In step 528, (Xr*Yr)+(Xi*Yi) is added, or accumulated, to the contents of target register Rto and (Xi*Yr)−(Xr*Yi) is added to the contents of target register Rte. The final result is written back to the target registers at the end of an operation cycle of the MPYCXJLA instruction 500 with a 32-bit real component and a 32-bit imaginary component placed in the target registers such that Rto contains the 32-bit real component and Rte contains the 32-bit imaginary component. For a two cycle embodiment, the target registers are fetched on the second cycle of execution to allow repetitive pipelining to a single accumulation register even-odd pair.

Figure 6C:
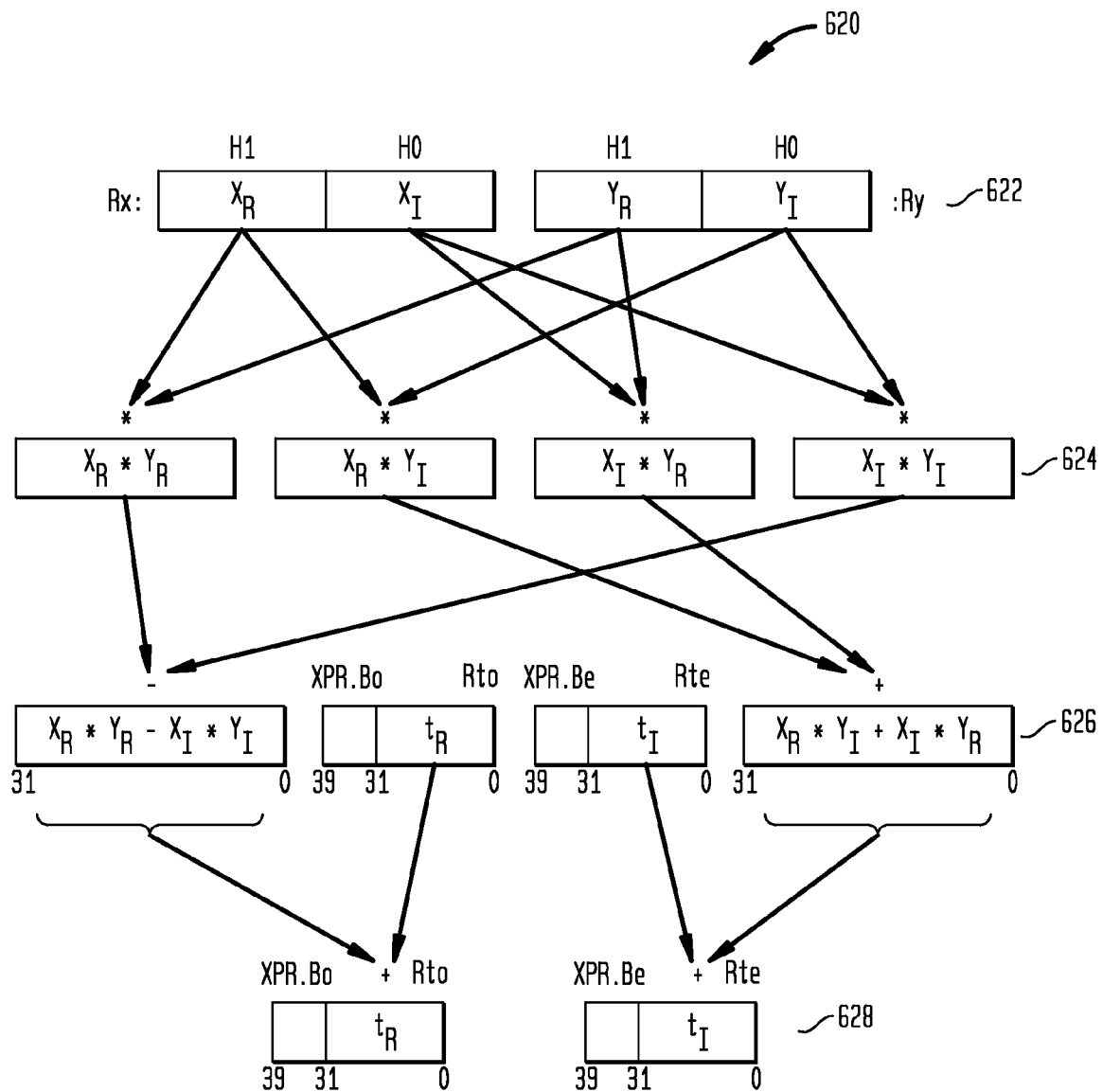

FIG. 6A shows a multiply complex long extended precision accumulate (MPYCXLXA) instruction 600 for the multiplication of two complex numbers to form a product which is accumulated with the contents of the extended precision target registers in accordance with the present invention. The syntax and operation description 610 of the MPYCXLXA instruction 600 are shown in FIGS. 6B and 6C. As seen in diagram 620 of FIG. 6C, the MPYCXLXA instruction 600 provides for the multiplication of two complex numbers stored in source register Rx and source register Ry. In step 622, the complex numbers to be multiplied are organized in the source registers such that H1 contains the real component of the complex numbers and H0 contains the imaginary component of the complex numbers. In step 624, the complex numbers are multiplied to produce the products Xr*Yr, Xr*Yi, Xi*Yr and Xi*Yi. Next, in step 626, the products are subtracted and added in the form of (Xr*Yr)−(Xi*Yi) and (Xr*Yi)+(X Yr). In step 628, the 32-bit value (Xr*Yr)−(Xi*Yi) is added to the contents of the extended precision target register XPRBo∥Rto and the 32-bit value (Xr*Yi)+(Xi*Yr) is added to the contents of the extended precision target register XPRBe∥Rte. The final result is written back to the extended precision target registers at the end of an operation cycle of the MPYCXLXA instruction 600 with a 40-bit real component and a 40-bit imaginary component placed in the target registers such that XPRBo∥Rto contains the 40-bit real component and XPRBe∥Rte contains the 40-bit imaginary component. For a two cycle embodiment, the target registers are fetched on the second cycle of execution to allow repetitive pipelining to a single accumulation register even-odd pair.

The extended precision bits for the 40-bit results are provided by the extended precision register (XPR). The specific sub-registers used in an extended precision operation depend on the size of the accumulation (dual 40-bit or single 80-bit) and on the target CRF register pair specified in the instruction. For dual 40-bit accumulation, the 8-bit extension registers XPR.B0 and XPR.B1 (or XPR.B2 and XPR.B3) are associated with a pair of CRF registers. For single 80-bit accumulation, the 16-bit extension register XPR.H0 (or XPR.H1) is associated with a pair of CRF registers. During the dual 40-bit accumulation, the even target register is extended using XPR.B0 or XPR.B2, and the odd target register is extended using XPR.B1 or XPR.B3. The tables 602, 604, 608, 612 and 614 of FIG. 6A illustrate the register usage in detail.

As shown in FIG. 6A, the XPR byte that is used depends on the Rte. Further details of an XPR register suitable for use with the present invention are provided in U.S. patent application Ser. No. 09/599,980 entitled "Methods and Apparatus for Parallel Processing Utilizing a Manifold Array (ManArray) Architecture and Instruction Syntax" filed on Jun. 20, 2000 which is incorporated by reference herein in its entirety.

Figures 7A, 7B:
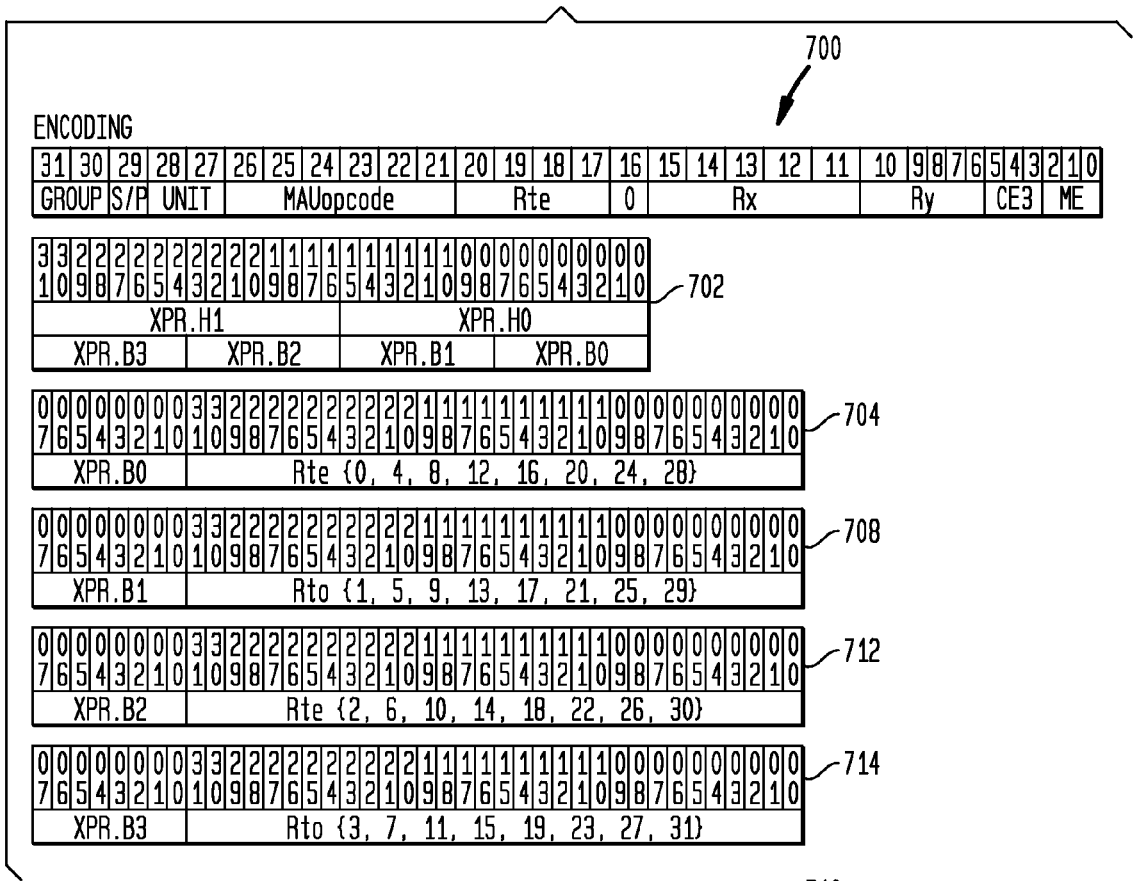
FIG. 7A illustrates a multiply complex conjugate long extended precision accumulate (MPYCXJLXA) instruction in accordance with the present invention.
FIGS. 7B and 7C illustrates the syntax and operation of the MPYCXJLXA instruction of FIG. 7A.
Figure 7C:
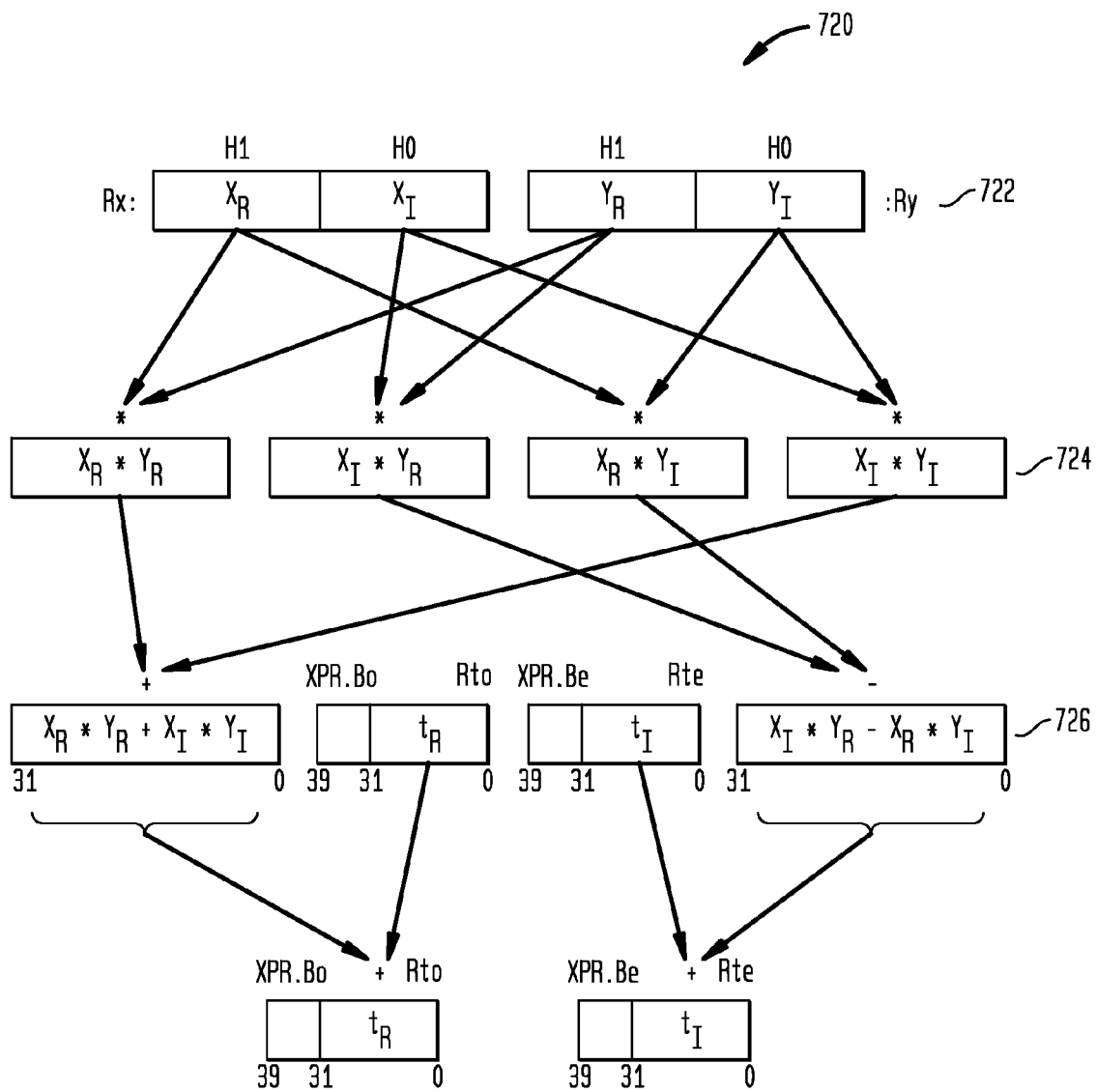

FIG. 7A shows a multiply complex conjugate long extended precision accumulate (MPYCXJLXA) instruction 700 for the multiplication of a first complex number and the conjugate of a second complex number to form a product which is accumulated with the contents of the extended precision target registers in accordance with the present invention. The syntax and operation description 710 of the MPYCXJLXA instruction 700 are shown in FIGS. 7B and 7C. As seen in diagram 720 of FIG. 7C, the MPYCXJLXA instruction 700 provides for the multiplication of two complex numbers stored in source register Rx and source register Ry. In step 722, the complex numbers to be multiplied are organized in the source registers such that H1 contains the real component of the complex numbers and H0 contains the imaginary component of the complex numbers. In step 724, the complex numbers are multiplied to produce the products Xr*Yr, Xr*Yi, Xi*Yr and Xi*Yi. Next, in step 726, the products are subtracted and added in the form of (Xr*Yr)+(Xi*Yi) and (Xi*Yr)−(Xr*Yi). In step 728, the 32-bit value (Xr*Yr)+(Xi*Yi) is added to the contents of the extended precision target register XPRBe∥Rte and the 32-bit value (Xi*Yr)−(Xr*Yi) is added to the contents of the extended precision target register XPRBo∥Rto. The final result is written back to the extended precision target registers at the end of an operation cycle of the MPYCXJLXA instruction 700 with a 40-bit real component and a 40-bit imaginary component placed in the target registers such that XPRBo∥Rto contains the 40-bit real component and XPRBe∥Rte contains the 40-bit imaginary component. For a two cycle embodiment, the target registers are fetched on the second cycle of execution to allow repetitive pipelining to a single accumulation register even-odd pair.

The extended precision bits for the 40-bit results are provided by the extended precision register (XPR). The specific sub-registers used in an extended precision operation depend on the size of the accumulation (dual 40-bit or single 80-bit) and on the target CRF register pair specified in the instruction. For dual 40-bit accumulation, the 8-bit extension registers XPR.B0 and XPR.B1 (or XPR.B2 and XPR.B3) are associated with a pair of CRF registers. For single 80-bit accumulation, the 16-bit extension register XPR.H0 (or XPR.H1) is associated with a pair of CRF registers. During the dual 40-bit accumulation, the even target register is extended using XPR.B0 or XPR.B2, and the odd target register is extended using XPR.B1 or XPR.B3. The tables 702, 704, 708, 712 and 714 of FIG. 7A illustrate the register usage in detail. As shown in FIG. 7A, the XPR byte that is used depends on the Rte.

All of the above instructions 200, 300, 400, 500, 600 and 700 may complete in 2 cycles and are pipelineable. That is, another operation can start executing on the execution unit after the first cycle. In accordance with another aspect of the present invention, all of the above instructions 200, 300, 400, 500, 600 and 700 may complete in a single cycle.

Figure 8:
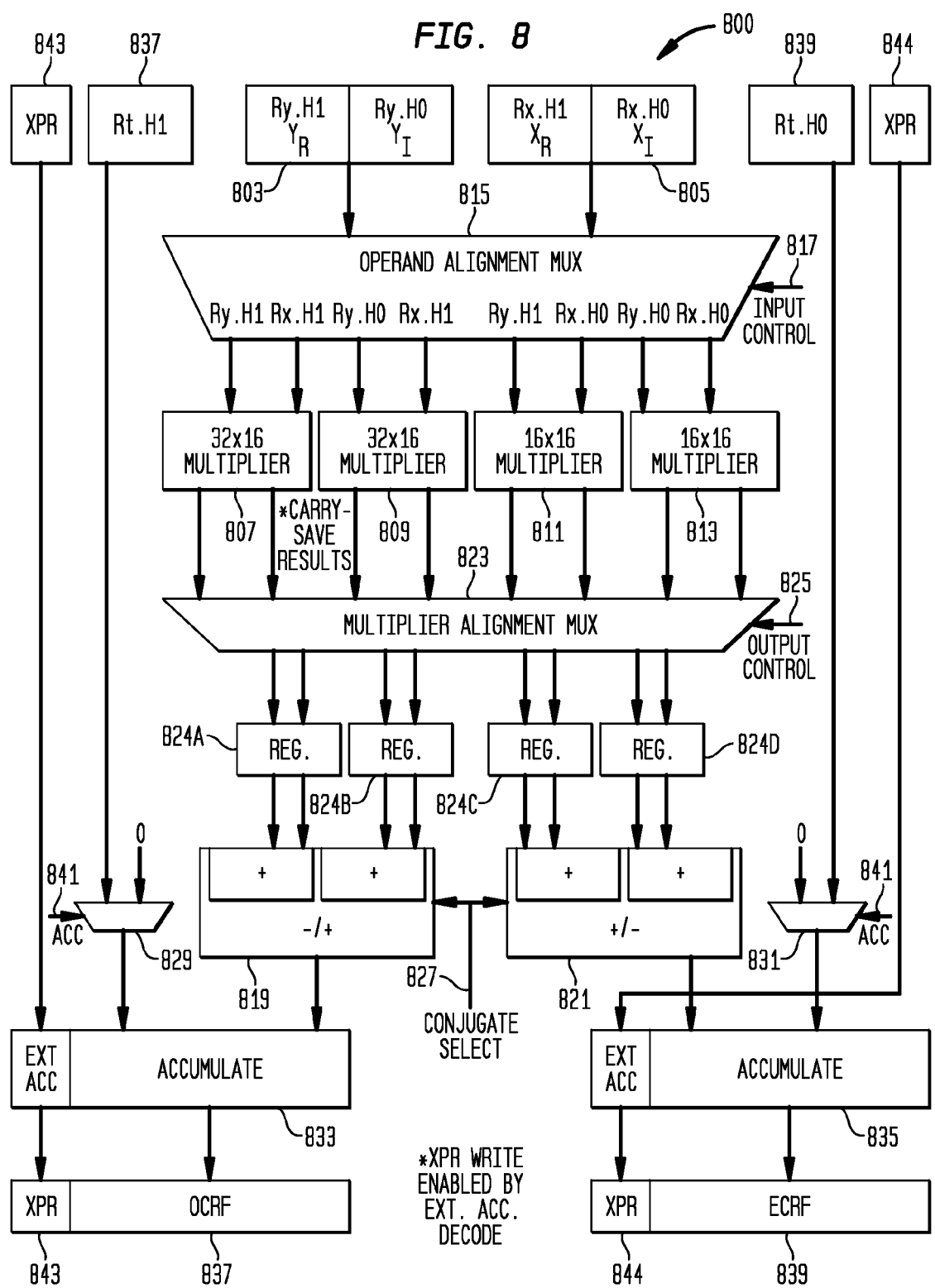
FIG. 8 shows a block diagram illustrating various aspects of hardware suitable for performing the MPYCXL, MPYCXJL, MPYCXLA, MPYCXJLA, MPYCXJLA, MPYCXLXA and MPYCXJLXA instructions in two cycles of operation in accordance with the present invention.

FIG. 8 shows a high level view of a hardware apparatus 800 suitable for implementing the multiply complex instructions for execution in two cycles of operation. This hardware capability may be advantageously embedded in the ManArray multiply accumulate unit (MAU), one of the execution units 131 of FIG. 1 and in each PE, along with other hardware capability supporting other MAU instructions. As a pipelined operation, the first execute cycle begins with a read of source register operands Ry.H1, Ry.H0, Rx.H1 and Rx.H0 from the compute register file (CRF) shown as registers 803 and 805 in FIG. 8 and as registers 111, 127, 127', 127'', and 127 in FIG. 1. These operands may be viewed as corresponding to the operands Yr, Yi, Xr and Xi described above. The operand values are input to multipliers 807, 809, 811 and 813 after passing through multiplexer 815 which aligns the halfword operands.

Multipliers 807 and 809 are used as 16×16 multipliers for these complex multiplications. The 32×16 notation indicates these two multipliers are also used to support 32×32 multiplies for other instructions in the instruction set architecture (ISA). Multiplexer 815 is controlled by an input control signal 817. The outputs of the multipliers, Xr*Yr, Xr*Yi, Xi*Yr and Xi*Yi, are input to registers 824a, 824b, 824c and 824d after passing through multiplexer 823 which aligns the outputs based on the type of multiplication operation. The registers 824a, 824b, 824c and 824d latch the multiplier outputs, allowing pipelined operation of a second instruction to begin. An output control signal 825 controls the routing of the multiplier outputs to the input registers 824a, b, c, d of adders 819 and 821. The second execute cycle, which can occur while a new multiply complex instruction is using the first cycle execute facilities, begins with adders 819 and 821 operating on the contents of registers 824a, 824b, 824c and 824d. The adders 819 and 821 function as either adders or subtractors based on a conjugate select signal 827, which is set depending on the type of complex multiplication being executed.

The outputs of the adders 819 and 821 are then passed to accumulators 833 and 835. If an accumulate operation is not being performed, a zero value is output from multiplexers 829 and 831 to accumulators 833 and 835 to produce a zero input for no accumulation. If an accumulate operation is being performed, the contents of current target registers Rt.H1 and Rt.H1, shown as registers 837 and 839, is output from multiplexers 829 and 831 to accumulators 833 and 835 as an input to produce an accumulated result. Multiplexers 829 and 831 are controlled by an accumulator control signal 841. The outputs of the accumulators 823 and 825 are then written to the target registers 837 and 839 which contain the 32 bit real result and the 32 bit imaginary result, respectively.

If an extended precision operation is being performed, the accumulation is augmented eight extra bits by adding the contents of an extended precision registers 843 and 844 to the sign extended output of adders 819 and 821. The outputs of the accumulators 833 and 835 are then written back to the target registers 837 and 839, and the XPR registers 843 and 844, such that registers 843 and 837 contain one of the 40 bit results and registers 844 and 839 contain the other 40 bit result. Real and imaginary results are specified by instructions.

Figure 9:
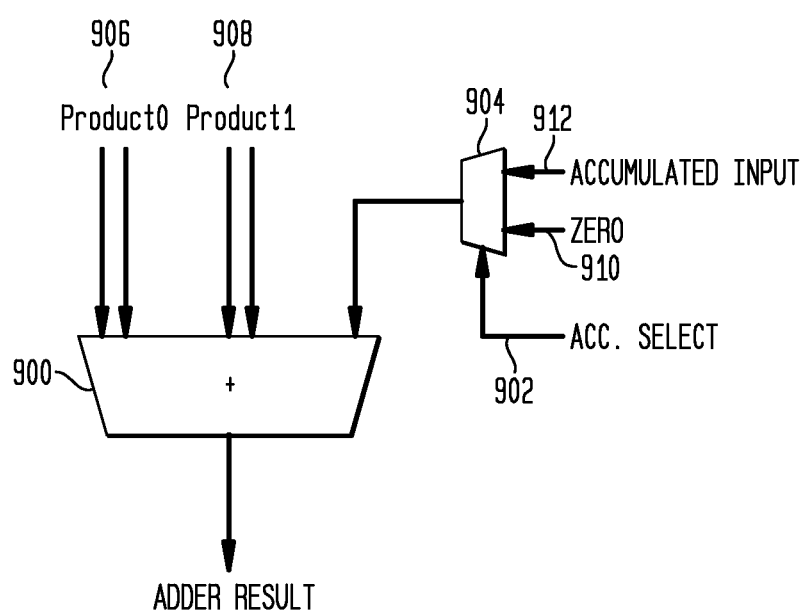
FIG. 9 shows an integrated product adder and accumulator in accordance with the present invention.

FIG. 9 shows an integrated product adder and accumulator (IPAA) 900 in accordance with the present invention. IPAA 900 may be suitably utilized with hardware 800, replacing an adder and accumulator, to decrease delay and improve performance. For instructions not requiring an accumulated result, select signal 902 controls multiplexer 904 to input a zero value 910 to IPAA 900 which performs addition or subtraction on product operands 906 and 908. For instructions requiring an accumulated result, select signal 902 controls multiplexer 904 to input an accumulated input 912 to IPAA 900 which performs addition or subtraction on product operands 906 and 908 to produce an accumulated result.

Figure 10:
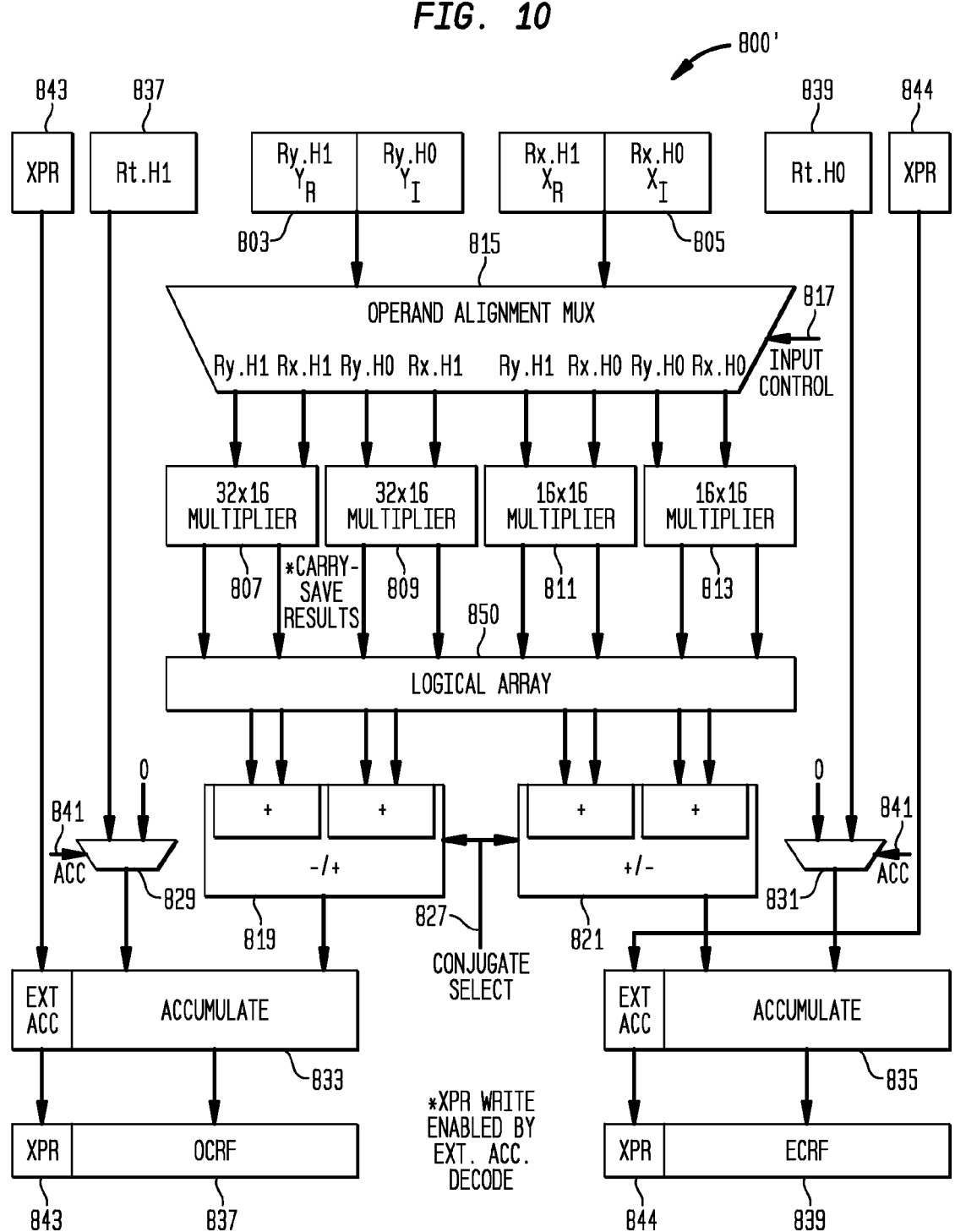
FIG. 10 shows a block diagram illustrating various aspects of hardware suitable for performing the MPYCXL, MPYCXJL, MPYCXLA, MPYCXJLA, MPYCXJLA, MPYCXLXA and MPYCXJLXA instructions in a single cycle of operation in accordance with the present invention.

FIG. 10 shows a high level view of a hardware apparatus 800' suitable for implementing the multiply complex instructions for execution in a single cycle of operation. Hardware apparatus 800' includes many of the same elements as hardware apparatus 800, with common elements to both embodiments designated by the same element numbers. The multiplier alignment multiplexer 823 and registers 824a, 824b, 824c and 824d of apparatus 800 are replaced by a logical array 850, allowing the multiply complex instructions to complete in a single cycle of operation. The logical array 850 properly aligns the outputs of multipliers 807, 809, 811 and 813 for transmission to the adders 819 and 821.

Computation of a Covariance Matrix

The multiply complex long instructions of the present invention may be advantageously used in the computation of a covariance matrix. As an example, consider an antenna array consisting of several elements arranged in a known geometry. Each element of the array is connected to a receiver that demodulates a signal and produces a complex-valued output. This complex-valued output is sampled periodically to produce a discrete sequence of complex numbers. The elements from this sequence may be organized into a vector of a certain length, called a frame, and may be combined with the vectors produced from the remainder of the antenna elements to form a matrix.

For an antenna array with M elements and K samples per frame, a matrix U is created.

$$U_{M \times K} = \begin{bmatrix} [u_0(0) & u_0(1) & \ldots & u_0(K-1)] \\ [u_1(0) & u_1(1) & \ldots & u_1(K-1)] \\ & & \vdots & \\ [u_{M-1}(0) & u_{M-1}(1) & \ldots & u_{M-1}(K-1)] \end{bmatrix}$$

$$R_{M \times M} = U \times U^H$$

In problems such as direction of arrival algorithms, it is necessary to compute the covariance matrix from such received data. For zero-mean, complex valued data, the covariance matrix, R, is defined to be where '$^H$' is the hermitian operator, denoting a complex conjugate matrix transpose.

Figure 11A:
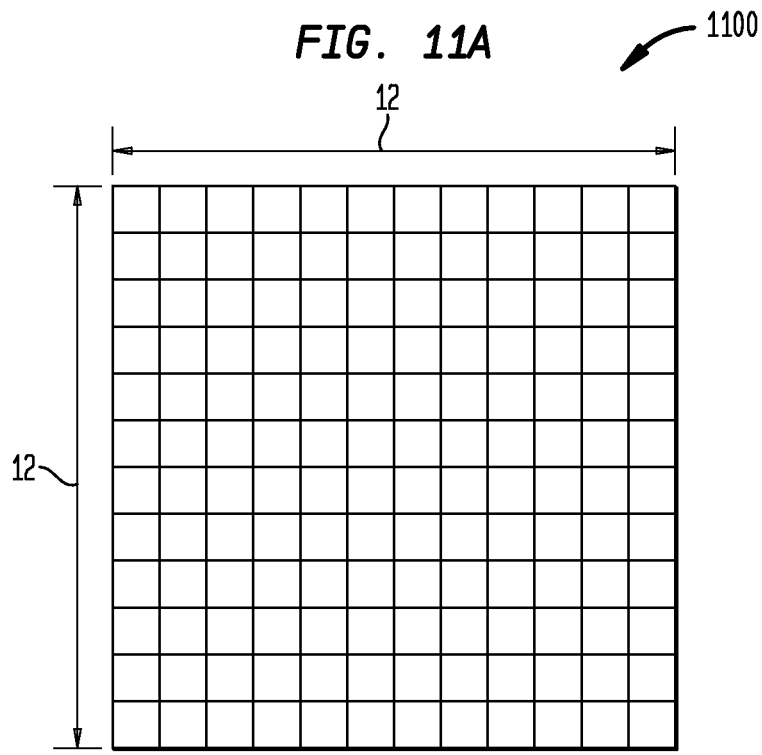
Figure 11B:
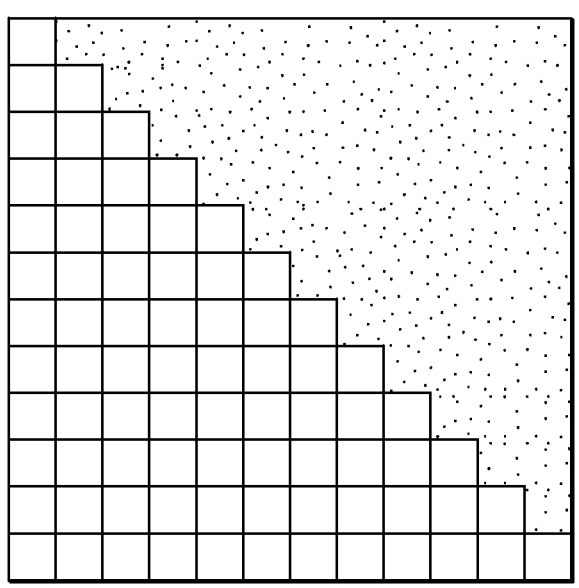

For example, assuming M=12 and K=128, the elements of R are computed as $$R_{i,j} = \sum_{k=0}^{K-1} u_i(k) \times (u_j(k))^*,$$

which corresponds to the summation of 128 complex conjugate multiplies for each of the 144 elements of R. As seen in FIG. 11A, R is a 12×12 matrix 1100. R is conjugate-symmetric, so the upper triangular portion of R is the complex conjugate of the lower triangular portion. $R_{i,j}=R_{i,j}^*$ for i≠j. As seen in FIG. 11B, this symmetry allows an optimization such that only 78 elements of R, the lower triangular portion and the main diagonal, need to be computed, as the remaining elements are the conjugated copies of the lower diagonal.

Each element in U is represented as a 16-bit, signed (15 information bits and 1 sign bit), complex value (16-bit real, 16-bit imaginary). Fixed-point algebra shows that the multiplication of two such values will result in a complex number with a 31-bit real and 31-bit imaginary component (30 information bits and 1 sign bit). The accumulation of 128 31-bit complex numbers, to avoid saturation (achieving the maximum possible positive or minimum possible negative value available for the given number of bits), requires 39 bits of accuracy in both real and imaginary components (38 information bits and 1 sign bit). Therefore to compute the covariance matrix for this system, it is necessary to utilize the complex multiply-accumulate function that achieves 31 complex bits of accuracy for the multiply, and can accumulate these values to a precision of at least 39 complex signed bits.

The computation of the 78 elements of the covariance matrix 1100 may be advantageously accomplished with the ManArray 2×2 iVLIW SIMD processor 100 shown in FIG. 1. Utilizing the single cycle pipeline multiply complex conjugate long with extended precision accumulate (MPYCXJLXA) instruction described above, 128 complex multiplies can be executed in consecutive cycles. As the iVLIW processor 100 allows 64 bits to be loaded into each PE per cycle, the computation of a single length 128 complex conjugate dot product is accomplished in 130 cycles, for a 2 cycle MPYCXJLXA. For a single cycle MPYCXJLXA, the computation is performed in 129 cycles.

Figure 11E:
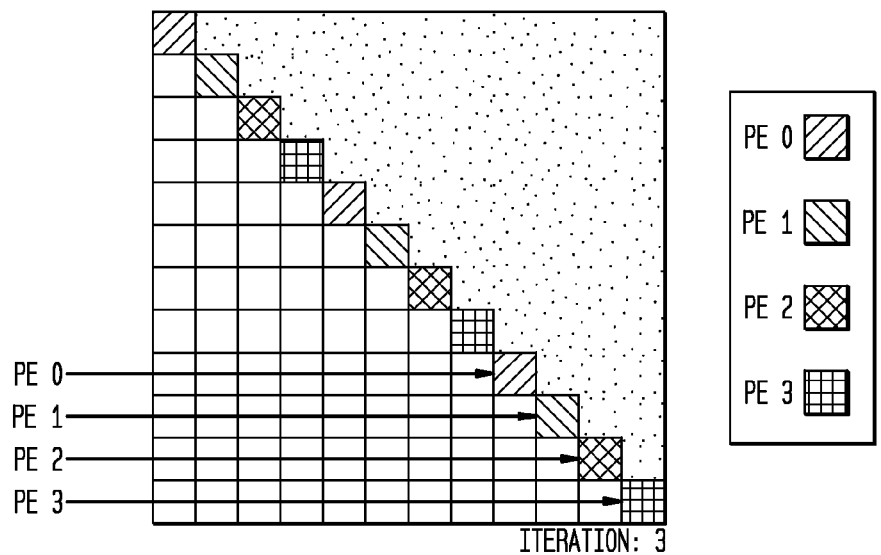
Figure 11F:
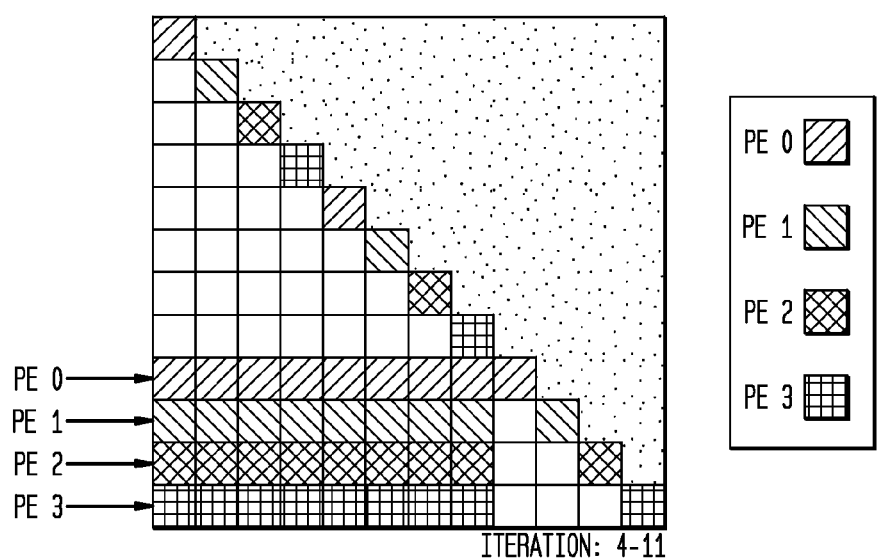
Figure 11G:
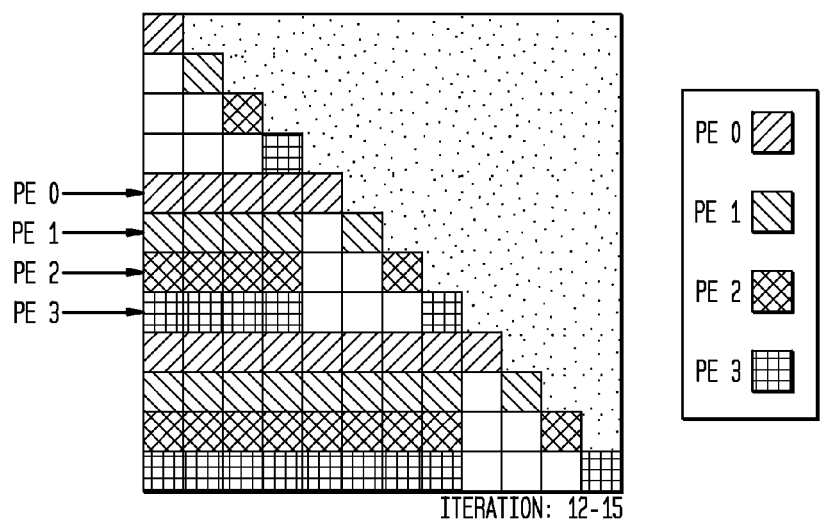
Figure 11H:
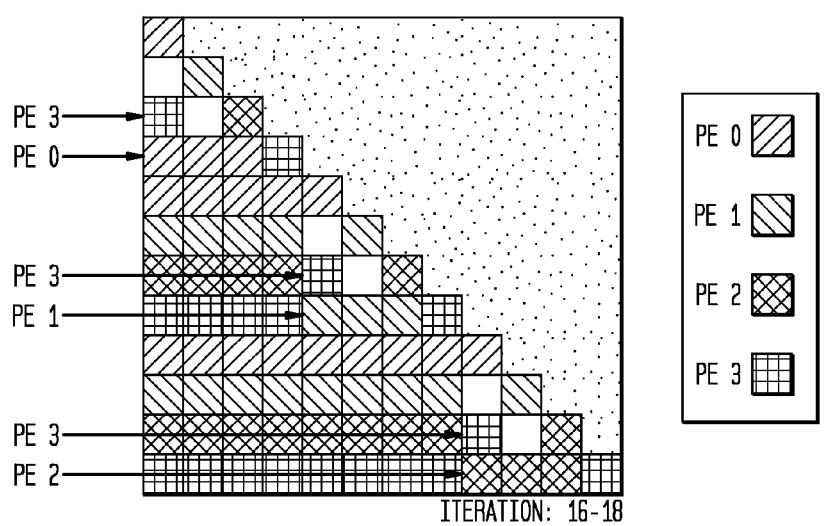
Figure 11I:
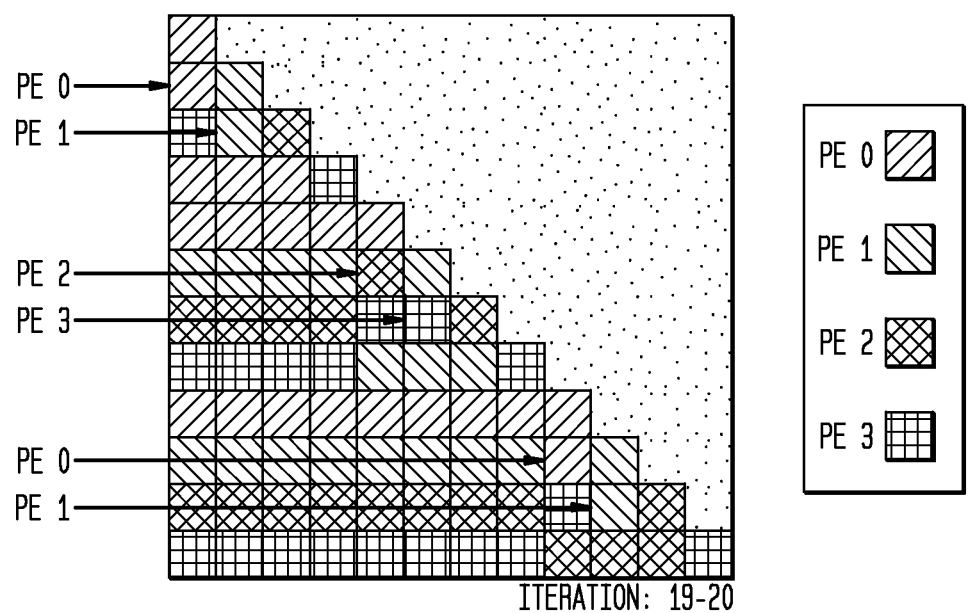

FIGS. 11C-11I show the computations performed by the 4 PEs (PE0, PE1, PE2 and PE3) of processor 100 to calculate the 78 elements of the covariance matrix R 1100. As seen in FIG. 11C, for iteration 1 PE0 performs the multiplications for $R_{0,0}$, PE1 performs the multiplications for $R_{1,1}$, PE2 performs the multiplications for $R_{2,2}$, and PE3 performs the multiplications for $R_{3,3}$. As seen in FIG. 11D, for iteration 2 PE0 performs the multiplications for $R_{4,4}$, PE1 performs the multiplications for $R_{5,5}$, PE2 performs the multiplications for $R_{6,6}$, and PE3 performs the multiplications for $R_{7,7}$. As seen in FIG. 11E, for iteration 3 PE0 performs the multiplications for $R_{8,8}$, PE1 performs the multiplications for $R_{9,9}$, PE2 performs the multiplications for $R_{10,10}$, and PE3 performs the multiplications for $R_{11,11}$. FIGS. 11F-H show the multiplications for iterations 4-11, 12-15, 16-18 and 19-20, respectively. Thus, the computation of the 78 elements of the covariance matrix from a 12×128 data matrix of 16-bit signed complex numbers occurs in 20 (dot product iterations)×130 (cycles per dot product)=2600 cycles, plus a small amount of overhead. The remaining elements of R are simply the conjugated copies of the lower diagonal. Prior art implementations typically would consume 79,872 cycles on a single processor with 8 cycles per complex operation, 128 complex operations per dot product and 78 dot products.

While the present invention has been disclosed in the context of various aspects of presently preferred embodiments, it will be recognized that the invention may be suitably applied to other environments consistent with the claims which follow.

We claim:

1. A method of calculating elements of a covariance matrix, the method comprising:
   providing a data array $U_{M \times K}$, wherein each element in U comprises a 16 bit real value and a 16 bit imaginary complex value, wherein M and K are positive integers greater than one;
   calculating elements of $R_{M \times M} = U \times U^H$ utilizing a multiply complex conjugate long extended precision accumulate (MPYCXJLXA) instruction which executes K times for each element on a processing element (PE) of an array processor.

2. The method of claim 1, wherein the execution of the MPYCXJLXA instruction K times calculates an $R_{i,j}$ element as a summation of K complex multiplies.

3. The method of claim 2, wherein the MPYCXJLXA instruction is pipelineable and the K complex multiplies are executed in consecutive cycles on the PE.

4. The method of claim 1, wherein the first element of R is at least 39 complex signed bits.

5. The method of claim 1, wherein the MPYCXJLXA instruction completes execution in 2 cycles.

6. The method of claim 1, wherein the MPYCXJLXA instruction completes execution in a single cycle.

7. The method of claim 1 further comprises:
 initiating on each PE a first execution the MPYCXJLXA instruction in a first cycle; and
 initiating on each PE a second execution the MPYCXJLXA instruction in a second cycle, the second cycle immediately following the first cycle.

8. The method of claim 1 further comprises:
 calculating additional elements of R by executing in parallel the MPYCXJLXA instruction K times on additional PEs of the array processor.

9. The method of claim 8, wherein the step of calculating elements utilizes a first PE and the step of calculating the additional elements utilizes a second PE operating in parallel with the first PE.

10. A method of calculating elements of a covariance matrix, the method comprising:
 calculating a lower triangular portion and a diagonal portion of an $R_{M \times M}$ covariance matrix from an M×K matrix of signed complex numbers by executing on each processing element (PE) of an array processor a multiply complex conjugate long extended precision accumulate (MPYCXJLXA) instructions K times in parallel with other MPYCXJLXA instructions executing on other PEs of the array processor, wherein M and K are positive integers greater than one; and
 calculating conjugate copies of the lower triangular portion as the upper triangular portion of the $R_{M \times M}$ covariance matrix.

11. The method of claim 10 further comprises:
 initiating on each PE a first execution the MPYCXJLXA instruction in a first cycle; and
 initiating on each PE a second execution the MPYCXJLXA instruction in a second cycle, the second cycle immediately following the first cycle, wherein K executions of the MPYCXJLXA instruction are executed on each PE.

12. The method of claim 10, wherein each execution of the MPYCXJLXA instruction multiplies a first signed complex number of the M×K matrix with a conjugate of a second signed complex number of the M×K matrix to form a product which is accumulated with the contents of an extended precision register.

13. The method of claim 10, wherein the MPYCXJLXA instruction identifies a first source register that contains a real component of a first complex number, second source register that contains an imaginary component of the first complex number, a third source register that contains a real component of a second complex number, and a fourth source register that contains an imaginary component of the second complex number.

14. The method of claim 13, wherein the MPYCXJLXA instruction multiplies the first complex number with a conjugate of the second complex number to form a product that is accumulated with contents of an extended precision target register.

15. A method of calculating elements of a covariance matrix, the method comprising:
 processing a sequence of K complex data samples received from each antenna element of an M element antenna array to create an M×K matrix U of complex numbers, wherein K and M are positive integers greater than one and appropriate elements $U_i(k)$ and $U_j(k)$ of matrix U are loaded in consecutive cycles to each processing element (PE) of N PEs;
 calculating in each PE a different element $R_{i,j}$ of a lower triangular portion and a diagonal portion of an $R_{M \times M}$ covariance matrix by generating a summation of K complex conjugate multiplies of the loaded elements $U_i(k)$ and $U_j(k)$ of matrix U, k varying from 0 to K−1; and
 calculating conjugate copies of the lower triangular portion as the upper triangular portion of the $R_{M \times M}$ covariance matrix.

16. The method of claim 15, wherein the summation of K complex conjugate multiplies comprises:
 executing a multiply complex conjugate long extended precision accumulate (MPYCXJLXA) instructions K times in each PE, wherein N summations of K complex conjugate multiplies are calculated on the N PEs.

17. The method of claim 16, wherein the MPYCXJLXA instruction multiplies the element $U_i(k)$, a first complex number, with a conjugate of the element $U_j(k)$, a second complex number, to form a product that is accumulated with contents of an extended precision target register.

18. The method of claim 15, wherein the appropriate elements $U_i(k)$ and $U_j(k)$ of matrix U are related to the different element $R_{i,j}$ in each PE.

19. The method of claim 17, wherein the contents of the extended precision target register include an extended precision real component and an extended precision imaginary component.

20. The method of claim 17, wherein the contents of the extended precision target register include an extended precision real component and an extended precision imaginary component that are each formatted with a first data type concatenated with a second data type to represent extended precision values, the first data type having less bits than the second data type.

* * * * *